June 27, 1944.  A. C. LINDGREN  2,352,276
TRACTOR IMPLEMENT
Filed Feb. 23, 1940  4 Sheets-Sheet 1

Inventors
A. C. Lindgren
and C. W. Mott.
By Paul O. Pippel
Atty

June 27, 1944. A. C. LINDGREN 2,352,276
TRACTOR IMPLEMENT
Filed Feb. 23, 1940 4 Sheets-Sheet 2

Inventors
A. C. Lindgren,
and C. W. Mott.
By Paul O. Pippel
Atty.

June 27, 1944. A. C. LINDGREN 2,352,276
TRACTOR IMPLEMENT
Filed Feb. 23, 1940 4 Sheets-Sheet 3

Inventors
A. C. Lindgren,
and C. W. Mott.
By Paul O. Pippel
Atty

June 27, 1944.  A. C. LINDGREN  2,352,276
TRACTOR IMPLEMENT
Filed Feb. 23, 1940  4 Sheets-Sheet 4
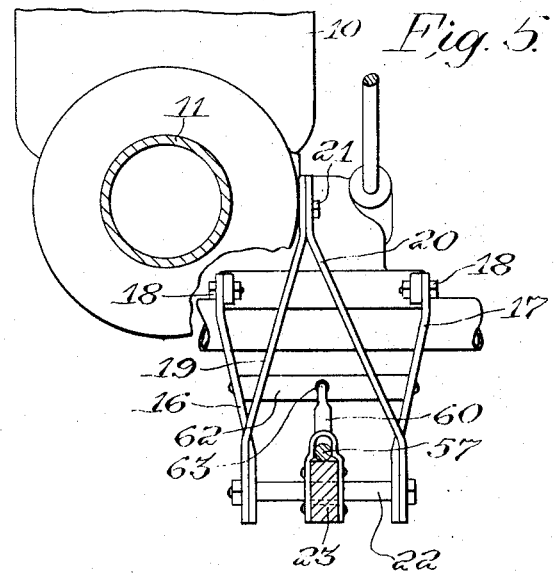
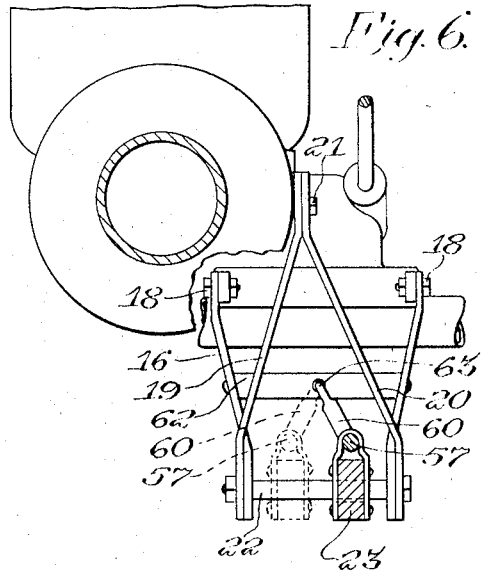
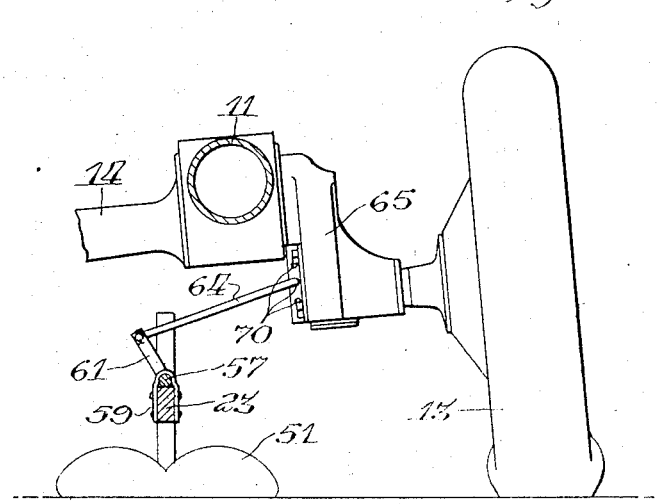

Patented June 27, 1944

2,352,276

UNITED STATES PATENT OFFICE 2,352,276

TRACTOR IMPLEMENT

Alexus C. Lindgren, Chicago, Ill., assignor to International Harvester Company, a corporation of New Jersey Application February 23, 1940, Serial No. 320,462

1 Claim. (Cl. 97—47)

This invention relates to tractor implements and more particularly to a type of implement for small tractors. It is an object of this invention to provide an arrangement for the connection of an implement to a small tractor whereby plow furrows can be made with the same spacing as with implements connected to large size tractors.

It is another object of the invention to provide, in such an implement adapted for small size tractors, means for laterally shifting the working tool beam and its ground working tool from one side of a neutral position to another side of a neutral position depending upon the particular rear wheel of the tractor that may be running either in the plowed furrow or the wheel nearest to the plowed land.

It is still another object of the invention to provide means included in the means for laterally adjusting the tool beam with respect to the tractor, whereby the forward portion of this beam will be automatically adjusted with the rear portion of the beam by means reacting automatically against the tractor.

It is still another and important object of the invention to provide in the supporting means an arrangement of its parts whereby leveling of the plow may be effected automatically with the lateral shifting of the plow beam and its plow.

According to the present invention, the tractor implement is a middle buster having a longitudinally extending beam connected at its forward end to the tractor for pivotal and lateral adjustment at a location ahead of the rear axle structure thereof, and at its rear portion to the rear axle structure by a supporting means adapted to be operated manually to effect lateral adjustment of the rear portion of the beam. In order to effect lateral adjustment of the forward portion of the beam, there is provided a rotatable means carried by the beam and adapted to react against the tractor whereby the forward portion of the beam will be automatically laterally adjusted. The supporting means for the rear portion of the beam comprises, generally, two downwardly extending, swingably, and laterally adjustable links. When the tractor wheels are laterally adjusted so that it is desired to operate one in a plowed furrow, these swingable links are arranged to converge downwardly so that, when lateral adjustment of the beam is effected from the neutral to a side position, one of the links will tend to become vertical with the ground and the other will have become more greatly inclined, thereby effecting automatic leveling of the plow beam and plow upon lateral adjustment of the same. Means is also provided for connecting the beam with respect to the links so that the links can remain parallel to each other and not in their converged arrangement. With the links parallel, lateral adjustment does not effect automatic leveling of the plow. With the plow so connected, the tractor wheels both run on unplowed ground. For a better understanding of the invention, reference may be had to the following description taken in connection with the accompanying drawings, in which:

Figure 5 is a view in elevation taken along the line 5—5 of Figure 1, showing a portion of the tractor and of the connection of the implement therewith;

Figure 6 is a view similar to Figure 5, showing the forward portion of the implement beam shifted to one side of a neutral position; and, Figure 7 is a detail view, showing the connection of the rotatable member with the rear axle housing of the tractor.

Figure 1:
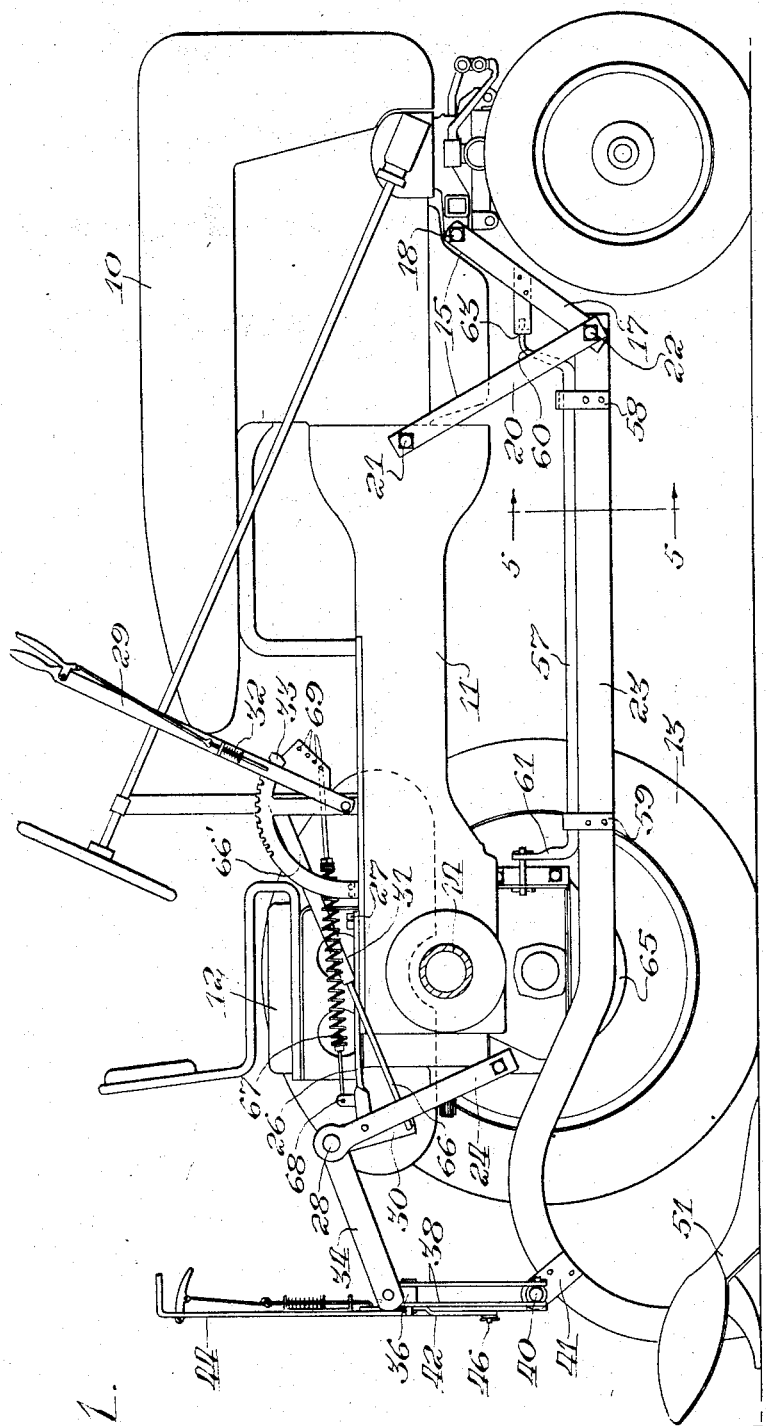
Figure 1 is a view in elevation of a tractor with the implement of the present invention attached thereto.
Figure 2:
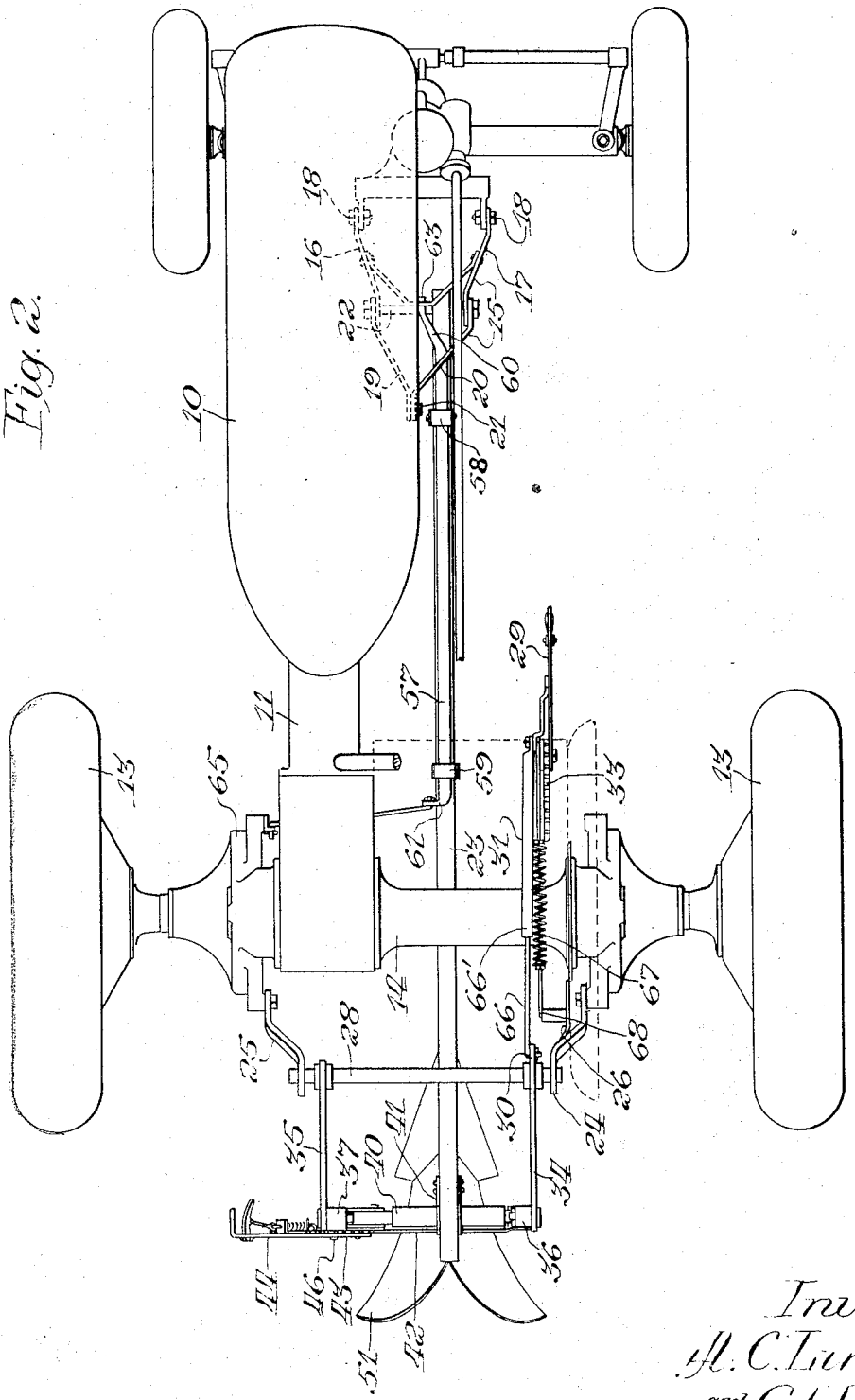
Figure 2 is a plan view of the tractor and the implement.
Figure 3:
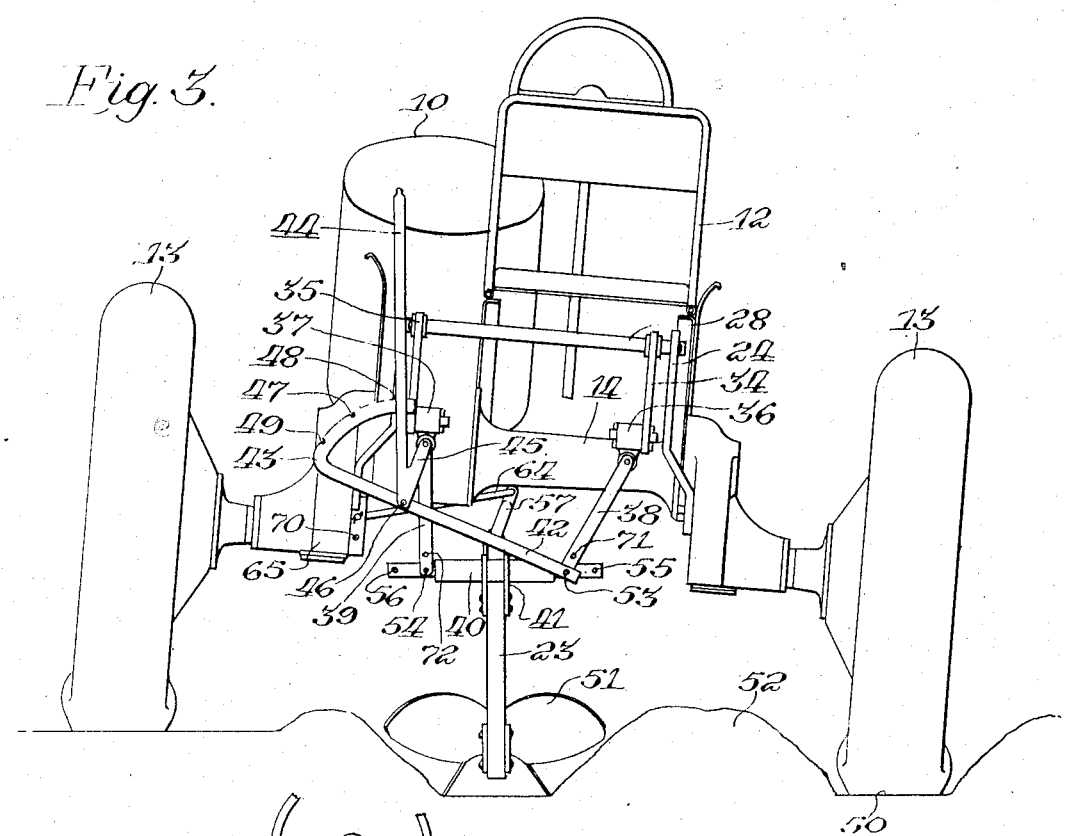
Figure 3 is a rear view of the tractor and implement, the tractor having its wheels adjusted to a wide setting with one of the same running in a furrow and the implement laterally adjusted away from the wheel running in the furrow.
Figure 4:
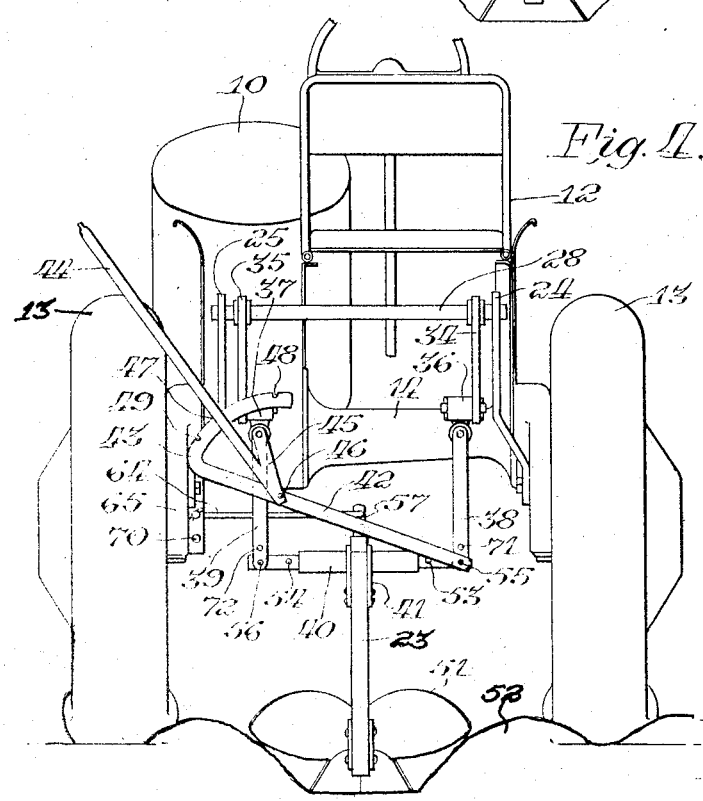
Figure 4 is a similar rear view of the tractor and implement, the tractor having its wheels set in a narrow setting with the implement in its neutral position.

Referring now particularly to Figures 1 and 2, there is shown a tractor of the type disclosed in U. S. Patent No. 2,221,546, issued November 12, 1940 in the names of Edward A. Johnston and Alexus C. Lindgren. This tractor is of small size and arranged with its power plant 10 and longitudinally extending body portion 11 located at one side of the center line to provide for full vision of an operator located at an operator's station 12, which is on the opposite side of the center line. The rear wheels 13 of this tractor are so constructed and so connected to the rear axle structure 14 that they may be reversed to have a wide setting, as shown in Figure 3, or arranged to have the narrow setting, as shown in Figure 4.

To the forward portion of the tractor there is connected a depending supporting structure 15 comprising, in general, a pair of downwardly and rearwardly extending members 16 and 17 connected to the tractor at 18, a second pair of downwardly and forwardly extending members 19 and 20 connected to the tractor at 21, and a shaft 22 interconnecting all four of said depending members at their lower ends. The shaft 22 provides means for connecting the forward end of a tool beam 23 to the depending structure 15 for pivotal and lateral adjustment.

On the rear of the tractor there are two vertically extending support members 24 and 25 held, respectively, in their upright position by brace members 26 extending forwardly on the top portion of the rear axle structure and connected thereto at 27. With these brace members so connected, the vertical members 24 and 25 are held rigidly to provide a support for a rock-shaft 28 therebetween, which is adapted to be rocked by a hand lever 29 located forwardly of the operator's station 12 and connected to an arm 30 on the rock-shaft 28 by a thrust means in the form of a link 31. The lever 29 has the usual latch mechanism 32 adapted to cooperate with a quadrant 33, and, upon the lever being pulled rearwardly, the rock-shaft will be rotated in a clockwise direction, as viewed in Figure 1, to effect vertical movement of arms 34 and 35 rigidly connected with the rock-shaft and extending rearwardly thereof.

To the rear ends of the arms 34 and 35 there are pivotally connected on a transverse axis, respectively, the trunnion blocks 36 and 37, to the trunnions on each of which there are connected for pivotal movement on longitudinal axes, respectively, the swingable pairs of links 38 and 39. To the lower ends of these links, there is pivotally connected a transverse member 40, which is rigidly connected with the rear portion of the plow beam 23 at 41. These parts of links permit lateral swingable adjustment of the beam structure 23 with respect to the tractor. In order to effect this lateral adjustment there is provided (see Figures 3 and 4), a diagonally disposed thrust member 42 connected at one end to the lower end of the swinging links 38 at their point of connection with the member 40. The opposite end of the thrust member 42 is formed to provide a segment portion 43, about which a lever 44 may be adjusted. This lever 44 has a reversed portion 45 at its lower end pivotally connected to the point of connection of the links 39 with the trunnion 37 and also pivotally connected at 46 to the thrust member 42. An adjustment of this lever 44 about the quadrant 43 to one side or to the other side of a neutral position 47, will effect lateral adjustment of the tool beam to one side or to the other side of its neutral position. The lever 44, when moved to a position 48, effects movement of the beam to the left, as viewed in Figures 3 and 4, and away from the rear tractor wheel running closest to the plowed land, or, as in the case of Figure 3, running in a furrow. Adjustment of the lever 44 to a position 49 will effect lateral adjustment of the plow beam 23 away from the opposite wheel, which will be operating nearest to the plowed ground or in the furrow upon the return travel of the tractor across the field being plowed. It should now be apparent that means is provided for supporting the rear portion of the plow beam 23 from the rear axle structure 14 of the tractor in such a manner that lateral adjustment of the same may be effected and that manual means including the lever 44 may be used for accomplishing this result.

In Figure 3, there are shown the wheels 13 arranged in the wide setting and the wheel at the right running in a previously plowed furrow 50, the plowing being accomplished by means of a middle buster plow 51 carried by the rear portion of the beam 23 where the dirt is thrown in both directions to form a ridge portion 52. With the small type tractors the wheels 13, when set in their wide setting, are spaced 68 inches whereas, if the plow was to be set centrally of the tractor, the only furrow spacing that could be accomplished would be half of the 68 inches, or 34 inches. With the larger tractors, it has been customary to have furrow spacings of amounts greater than 34 inches. Therefore, in order to provide for a larger furrow spacing for small tractors, the provision for laterally adjusting the plows is herewith made. By being able to adjust the plow laterally away from the tractor wheel running in the furrow, a greater furrow spacing may be had. With the structure shown it is possible to shift the plow two inches or so away from its center position, thereby permitting a furrow spacing of 36 inches.

In order to provide a means for effecting leveling of the plow automatically with the lateral adjustment of the plow, the links 38 and 39 are connected, as shown in Figure 3, with the transverse member 40, so that, when the plow is centrally located, these links will converge downwardly. As the plow beam is adjusted by the manual lever 44 to a position away from the wheel 13 traveling in the furrow 50, the links 39 will tend to become vertical while the links 38 will tend to have a greater angle with the vertical. The result is that the side of the plow farthest from the furrow wheel 13 is lowered while the side of the plow nearest to the furrow wheel 13 is raised, thereby effecting automatic leveling adjustment of the plow 51. The lengths of the links with relation to the tractor and to the plow beam are such as to provide the proper amount of leveling for the normal furrow depth. As the tractor is turned about at the end of the field to proceed across the field with the opposite rear wheel in the furrow and with the plow 51 shifted away from that wheel, the links 38 would then become vertical and the links 39 would be angled to a greater degree with the vertical. Thus, it should be seen that, by having such downwardly converging links, automatic tilting can be effected irrespective of the particular rear wheel running in the furrow. Where furrow spacings of more or less than 36 inches are desired, this may be accomplished by running the furrow wheel of the tractor to one side or the other of the center of the furrow, the wheel hugging close to one wall or the other of the furrow.

Where greater furrow spacings are desired than that accomplished with the arrangement shown in Figure 3, the tractor wheels 13 are set at their narrow settings, so that both wheels are run on the unplowed ground. The wheel 13 nearest to the plowed ground may travel close or removed from the edge wall of the previously formed furrow. Since both wheels, as shown in Figure 4, are running on the unplowed ground, it is not necessary to provide for automatic tilting of the plow 51 when it is laterally adjusted. Therefore, the swingable links 38 and 39 are arranged to be vertical in the neutral position shown in Figure 4, and are angled alike when the plow is laterally adjusted. In other words, the lower ends of the swingable links 38 and 39, instead of being connected to the transverse member 40 at 53 and 54, respectively, are connected at 55 and 56, respectively. With this arrangement, as shown in Figure 4, furrow row spacings up to 42 inches may be had.

In order to insure that there will be a lateral adjustment of the forward portion of the beam 23 with respect to the rod 22, there has been provided means adapted to react against the tractor so that the forward portion will be automatically adjusted laterally upon the lateral adjustment effected by the manual lever 44. This means comprises a rotatable member 57 carried on the beam and held on the top thereof in rotatable relationship by means of straps 58 and 59. This member has upturned at each end, respectively, arms 60 and 61. The arm 60 is adapted to cooperate with a transverse member 62 of the depending structure 15. When the beam 23 is centrally located in a neutral position, as shown in Figure 5, the arm 60 is vertical, being connected at a point 63 centrally of the depending structure 15. The arm 61 at the rear end is connected by means of a jockey link 64 to a depending housing 65 of the rear axle structure 14. By the connection of the arms 60 and 61, respectively, with the depending structure 15 and with the depending housing 65, it should be seen that lateral movement will automatically be given to the forward portion of the beam 23 as the rear portion of the beam is adjusted by the manual lever 44. The jockey link 64 provides for up and down movement of the beam about its pivotal connection with the rod 22 as the beam is lifted or adjusted to transport position on the tractor.

The thrust means 31 connecting the lever 29 with the arm 30 of the rock-shaft 28 includes telescoping parts 66 and 66'. These telescoping parts have lost motion in order to permit the plow to rise vertically during its operation due to unevenness of the ground. This lost motion is taken up upon operating the lever 29 to effect lifting of the plow to transport position. To assist in the lifting operation, there is provided a helper spring 67 anchored to the tractor at 68 and may be connected to the lever 29 at a variety of locations 69. The plow depth may be adjusted by the lever 29 by the setting of the same at any location on the quadrant 33, but as the lever is pulled back to its full extent the plow bottom is lifted to its full extent on the quadrant.

In order to provide greater or less lateral throw of the arm 61 with respect to the depending housing 65, the jockey link 64 may be connected to the depending housing 65 in any one or more of the holes 70. The adjustment of this link 64 in these holes will thereby change the point of reaction on the tractor. As shown in Figure 6, the forward portion of the beam will be thrown so that the arm 60 is at an angle to the right or left of the location of the same, as shown in Figure 5. The links 38 and 39 respectively have hole means 71 and 72, respectively, whereby the transverse member 40 may be given a vertical adjustment with respect to the arms of the rock-shaft, thereby in effect shortening the length of the links 38 and 39. This adjustment is convenient when the middle busters are being used to open previously formed ridges, since when opening previously formed ridges both wheels will run in the previously formed furrows.

It should now be apparent from the foregoing that a plow structure has been provided for small tractors whereby the same furrow spacings may be had as with tractors of larger size. In being able to laterally adjust the tractor wheels between narrow and wide settings and by being able to laterally adjust the plow beam to one side or the other of neutral position, this has been accomplished.

While various changes may be made in the detail construction of this invention, it should be understood that such changes shall be within the spirit and scope of the present invention as defined by the appended claim.

What is claimed is:

In combination, a tool-supporting structure having spaced wheels one of which is arranged to run in a furrow, a working tool, means for so connecting the working tool to the tool-supporting structure as to provide for simultaneous lateral and leveling adjustment of the same upon the working tool being laterally moved, and means for adjustably moving the working tool comprising a tool-lifting structure, links depending at their ends from said tool-lifting structure in spaced relation laterally of the tool-supporting structure and having pivotal connections at such ends with the tool-lifting structure to facilitate swinging of said links laterally of the tool-supporting structure, a tool-supporting member extending between and having pivotal connections with the other ends of said links to also facilitate the swinging thereof, and the lateral spacing of said links at the first-named ends being different than at said other ends, whereby upon lateral adjustment of the working tool the same will be leveled as well as laterally adjusted as when the one wheel is arranged to run in the furrow.

ALEXUS C. LINDGREN.